Patented Mar. 11, 1952

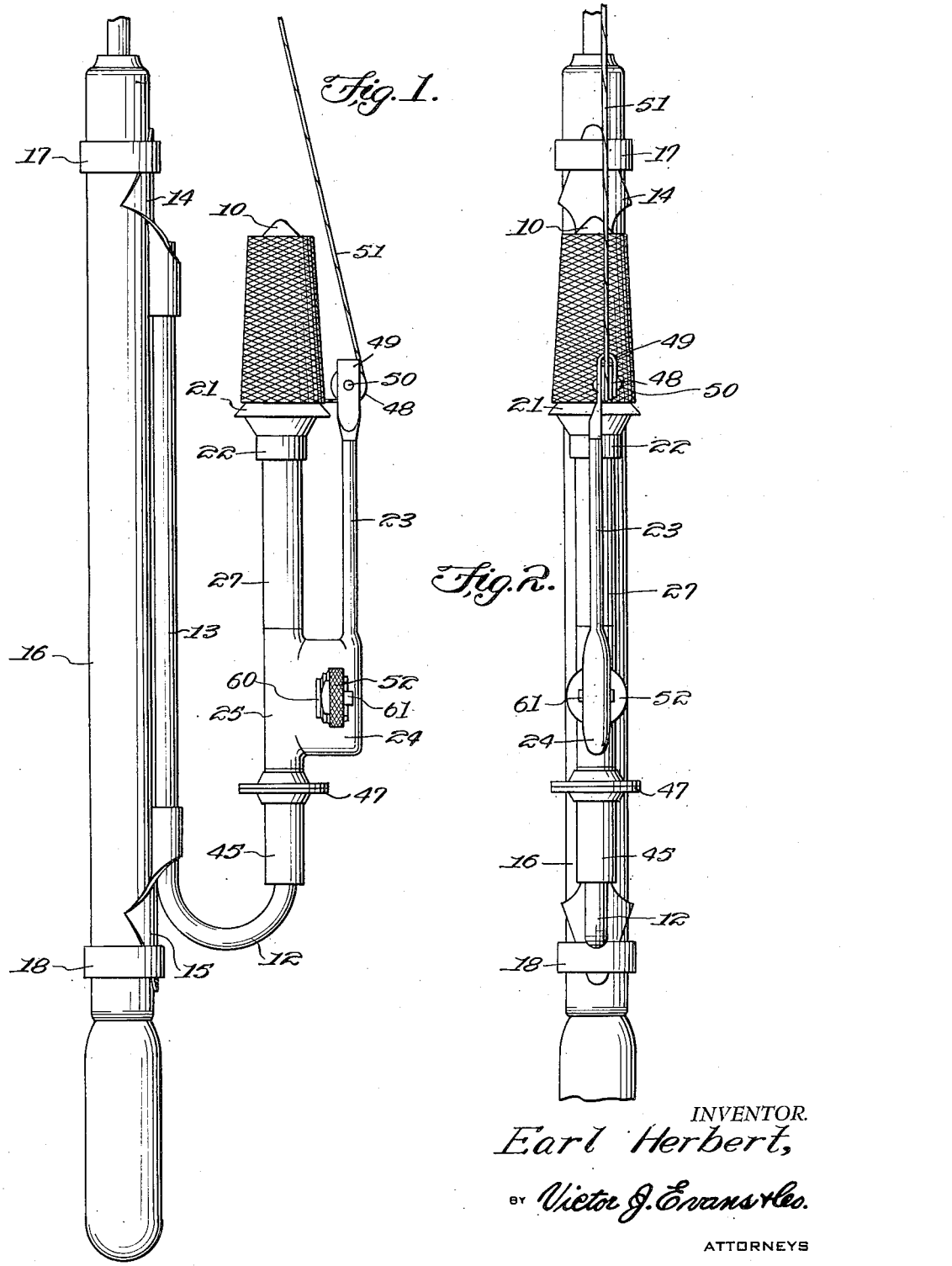

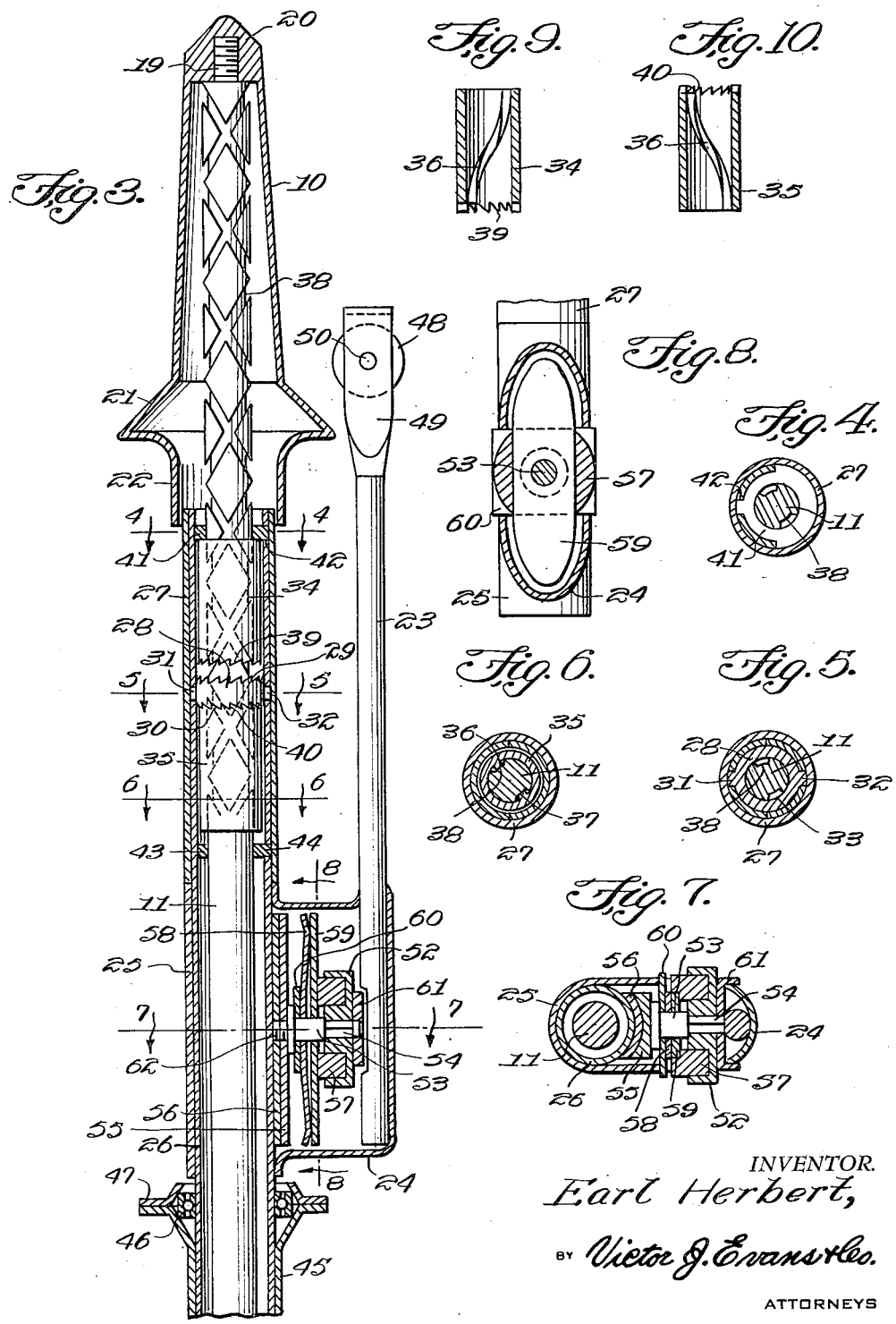

2,588,524

UNITED STATES PATENT OFFICE 2,588,524

END CASTING AND RETRIEVING REEL

Earl Herbert, St. Joseph, Mo.

Application October 27, 1949, Serial No. 123,966

5 Claims. (Cl. 242—84.4)

This invention relates to fishing reels of the type in which the line is pulled over the end of the reel in casting, and in particular a reel carried by a U-shaped bracket on the side of the handle of a fishing rod with the axis of the reel parallel to the axis of the fishing rod.

The purpose of this invention is to provide an end casting fishing reel in which the line is pulled over coils remaining on the reel in casting without contacting the said remaining coils and also in which means is provided for rewinding the fishing line in layers upon the reel.

In the usual end casting reel the fishing line is pulled over a flange or plate or fed through openings in a reel casing or frame and the friction caused by the line passing over stationary parts causes the line to hesitate in casting and is therefore objectionable. With this thought in mind this invention contemplates a fishing line reel having a tapering or conical shaped core positioned with the axis thereof parallel to the axis of the fishing rod and a pulley carried by an arm journaled on the spindle of the reel and mounted to travel with a longitudinal movement for feeding and winding the line on the reel in retrieving.

The object of this invention is, therefore, to provide means for mounting a fishing reel on a fishing rod whereby the line may be cast from the reel without sliding over coils thereon and also whereby the line may be wound on the reel and fed longitudinally thereto to provide even layers on the reel core.

Another object of the invention is to provide an end casting fishing reel having rewinding means in combination therewith that may readily be attached to the handle of a fishing rod.

A further object of the invention is to provide an improved reel with mounting and rewinding means in combination therewith which is of a simple and economical construction.

With these and other objects and advantages in view the invention embodies a U-shaped bracket adapted to be mounted on the handle of a fishing rod with one end positioned against the handle of the rod and the other spaced therefrom and with a tapering stationary reel core carried by the end of the bracket spaced from the handle of the rod and also a line winding arm journaled on the bracket and adapted to travel longitudinally in relation to the core of the reel as it travels around the core.

Other features and advantages of the invention will appear from the following description taken in connection with the drawings wherein:

Figure 1 is a side elevational view showing the end casting reel mounted on the handle of a fishing rod with the outer part of the rod broken away.

Figure 2 is also an elevational view taken at right angles to the view shown in Figure 1 and looking toward the side of the rod on which the reel is positioned.

Figure 3 is a longitudinal section on an enlarged scale with the parts in the position as illustrated in Figure 1 and showing the construction of the reel mounting and winding elements.

Figure 4 is a cross section through the winding elements of the reel taken on line 4—4 of Figure 3.

Figure 5 is a similar section taken on line 5—5 of Figure 3.

Figure 6 is also a similar section taken on line 6—6 of Figure 3.

Figure 7 is a cross section taken on line 7—7 of Figure 3 showing the winding arm mounting and the friction applying elements therein.

Figure 8 is longitudinal section taken on line 8—8 of Figure 3 and also showing the friction elements.

Figure 9 is a detail showing a longitudinal section through one of the clutch bushings mounted in the winding arm sleeve.

Figure 10 is a similar detail showing another bushing positioned in the winding arm sleeve and on the opposite side of the clutch member.

Referring now to the drawings wherein like reference characters denote corresponding parts the improved end casting fishing reel of this invention includes a tapering core 10 mounted on the outer end of a spindle 11 with the spindle forming an arm of a U-shaped bracket 12 and with the other arm 13 of the bracket provided with mounting slips 14 and 15 by which the bracket is held on a handle 16 of a fishing rod by bands 17 and 18.

The outer end of the spindle 11 is provided with a threaded stud 19 on which the core 10 is threaded through an outer end 20. The inner end of the core 10 is provided with a beveled flange 21 and a sleeve 22 extends from the flange. The core 10 is supported by the bracket 12 in a fixed position and a fishing line may be wound thereon and cast therefrom. With the core tapering outwardly a fishing line leaving a coil on the larger inner end passes over the coil on the outer part of the core without contacting the outer surface thereof whereby the line travels outwardly in casting without frictional contact with parts of the reel or of a line thereon.

The reel is provided with a winding arm 23 that is carried in an extension 24 of a sleeve 25 and the sleeve 25 is mounted on an inner sleeve 26 that is slidably mounted on the spindle 11. An outer sleeve 27 is also provided on the inner sleeve 26 between the end of the sleeve 25 and the outer end of the inner sleeve.

A clutch collar 28 having teeth 29 on one side and teeth 30 on the opposite side is positioned in the inner sleeve 26 and secured therein by projections 31 and 32 as shown in Figure 5. The clutch collar 28 is provided with a bore 33 that slides over the spindle 11 as the winding arm 23 is actuated. A clutch bushing 34 is positioned in the outer end of the sleeve 26 and a corresponding bushing is positioned in the opposite end, and these bushings are provided with inwardly extended lugs 36 and 37 that extend into a double thread 38 on the spindle 11 as shown in Figure 6. The bushing 34 is provided with teeth 39 that coact with the teeth 29 of the clutch collar 28 and the bushing 35 is provided with teeth 40 which, as illustrated in Figure 3 engage the teeth 30 of the collar 28.

A stop washer 41 is provided in a slot 42 in the outer end of the sleeve 26 and a similar stop washer 43 is provided with parts thereof extended into a slot 44 in the inner part of the sleeve 26.

The winding arm 23 is actuated by a tubular handle 45 rotatably mounted on the sleeve 26 and having a ball bearing 46 in a flange 47 thereof. As the handle 45 is moved outwardly on the spindle 11 the clutch collar 28 drops away from bushing 35 and washer 43 engages bushing 35 whereby with outward movement of the arm the studs 36 and 37 of the bushing 34 will follow the double threads 38 of the spindle and, coacting with the teeth of the collar 28 will cause the sleeve 26 to rotate whereby the arm 23 is rotated around the reel or core 10. With the return movement of the handle 45 the stop washer 41 moves against bushing 34 and bushing 35 holds the bushing in contact with the teeth of the clutch collar 28, as shown in Figure 3 whereby with the studs 36 and 37 of the bushing 35 following the double threads the sleeve 26 will continue to rotate in the same direction swinging the arm 23 around the reel or core 10.

A small pulley 48 is journalled in a clip 49 on the outer end of the arm 23, the pulley being mounted on a pin 50 and the lower end of the clip 49 being open so that a fishing line 51 may readily be placed over the pulley and also readily removed therefrom.

The outwardly extended section 24 of the sleeve 25 is provided with friction retarding elements including a knurled nut 52 on a stud 53 with the stud provided with a square outer end 54 and a head 55 on the inner end bears against a shoe 56 that engages the outer surface of the sleeve 26, as shown in Figures 3 and 7. The nut 52 is provided with an inner ring 57 that rides on spring plates 58 and 59 on a lock washer 60. A similar lock washer 61 is provided on the outer end of the stud and the inner end 62 of the stud is threaded through the upper and lower sections of the shoe 56 as shown in Figure 3. The nut 52 may therefore be rotated, to adjust the friction, thereby providing a brake retarding the rotating movement of the arm 23.

With the parts arranged in this manner the fishing line will pay out freely in casting in which the arm 23 and pulley 48 are not used, the line passing directly from the larger turn or coil at the large end of the core and passing over the smaller turns or coils whereby the line is not subjected to friction resulting from the line contacting or sliding over fixed surfaces or elements.

In retrieving the fishing line the line is placed around the pulley 48 and by sliding the sleeve or handle 45 outward and inward the pulley 48 is turned around the core 10 as it moves longitudinally of the core thereby winding the line in layers on the core.

A fish striking the line 51 causes an outward pull on the line and the arm 23 may rotate to unwind the line with the travel thereof controlled by a friction brake actuated by the knurled roller or disc 52 which extends through openings 62 in the sides of the section 24 of the arm mounting sleeve.

It will be understood that modifications may be made in the design and arrangement of the parts without departing from the spirit of the invention.

What is claimed is:

1. A fishing line casting reel comprising a U-shaped bracket having a mounting arm and a spindle arm parallel to the mounting arm, means for attaching the mounting arm to the handle of a fishing rod, a tapering reel core carried by the outer end of the spindle arm, said spindle arm having a double thread on the end thereof, a line winding arm spaced from and rotatably mounted on the said spindle arm, line guide means in the outer end of the line winding arm, said line winding arm adapted to be manually reciprocated in relation to the spindle arm, means actuated by the said double thread of the spindle arm rotating the line winding arm around the spindle, and a brake carried by the line winding arm for retarding rotation of the said arm on the spindle.

2. A fishing line casting reel comprising a U-shaped bracket having a mounting arm and a spindle arm parallel to the mounting arm, means for attaching the mounting arm to the handle of a fishing rod, a tapering reel core carried by the outer end of the spindle arm, a line winding arm spaced from and rotatably mounted on the said spindle arm, line guide means in the outer end of the line winding arm, a reciprocating handle slidably mounted on the spindle, and means rotating the line winding arm by the reciprocating handle.

3. A fishing line casting reel comprising a U-shaped bracket having a mounting arm and a spindle arm parallel to the mounting arm, means for attaching the mounting arm to the handle of a fishing rod, a tapering reel core carried by the outer end of the spindle arm, a line winding arm spaced from and rotatably mounted on the said spindle arm, line guide means in the outer end of the line winding arm, a reciprocating handle slidably mounted on the spindle, and means rotating the line winding arm about the spindle and core and imparting longitudinal movement to the arm as the handle is reciprocated.

4. In a fishing line end casting reel, the combination which comprises a tapering reel core having a small outer end with a flange around the larger inner end, a spindle having a double thread therein on the outer end of which the reel core is positioned, traveling sleeves positioned on the spindle, a line carrying arm mounted on the sleeves, opposed bushings mounted on the spindle and positioned within the sleeves, said bushings having lugs extended into the said double thread of the spindle, a clutch collar mounted in the sleeves and positioned around the spindle, a freely mounted tubular handle positioned on the sleeves whereby upon reciprocation of the handle the bushings and lugs rotate the line carrying arm around the core and impart longitudinally disposed reciprocating travel thereto, and means for mounting the spindle on a fishing rod with the axis of the spindle and core parallel to the rod.

5. In a fishing line end casting reel, the combination which comprises a tapering reel core having a small outer end with a flange around the larger inner end, a spindle having a double thread therein on the outer end of which the reel core is positioned, traveling sleeves positioned on the spindle, a line carrying arm mounted on the sleeves, opposed bushings mounted on the spindle and positioned within the sleeves, said bushings having lugs extended into the said double thread of the spindle, a clutch collar mounted in the sleeves and positioned around the spindle, a freely mounted tubular handle positioned on the sleeves whereby upon reciprocation of the handle the bushings and lugs rotate the line carrying arm around the core and impart longitudinally disposed reciprocating travel thereto, means for mounting the spindle on a fishing rod with the axis of the spindle and core parallel to the rod, and friction means positioned between the arm and sleeves upon which the arm is mounted for retarding rotation of the arm around the spindle.

EARL HERBERT.

REFERENCES CITED

The following references are of record in the file of this patent:

UNITED STATES PATENTS

| Number | Name | Date |
|---|---|---|
| 1,187,840 | Illingworth | June 20, 1917 |
| 2,314,616 | Gaire | Mar. 23, 1943 |

FOREIGN PATENTS

| Number | Country | Date |
|---|---|---|
| 351,820 | Great Britain | July 2, 1931 |
| 373,786 | Great Britain | June 2, 1932 |